Oct. 1, 1935.    L. L. IRVIN    2,016,236
PARACHUTE APPARATUS
Filed March 28, 1934    3 Sheets-Sheet 1

INVENTOR.
Leslie L. Irvin
BY Lancaster, Allwine and Rommel
ATTORNEYS.

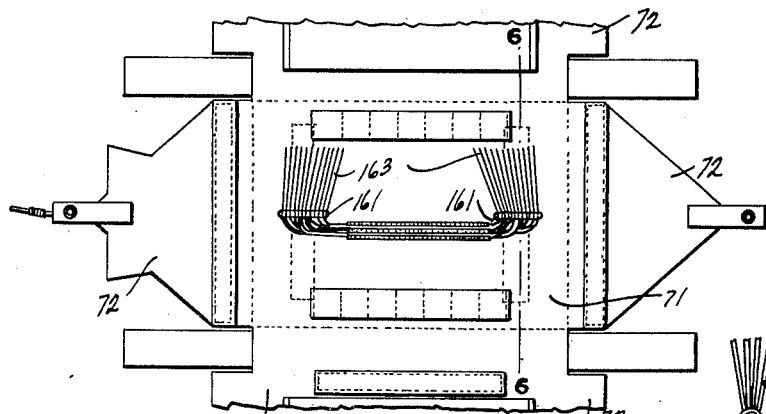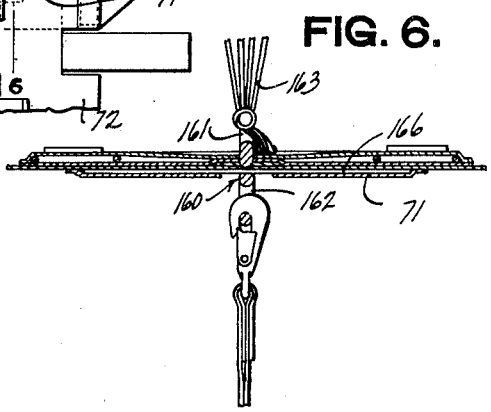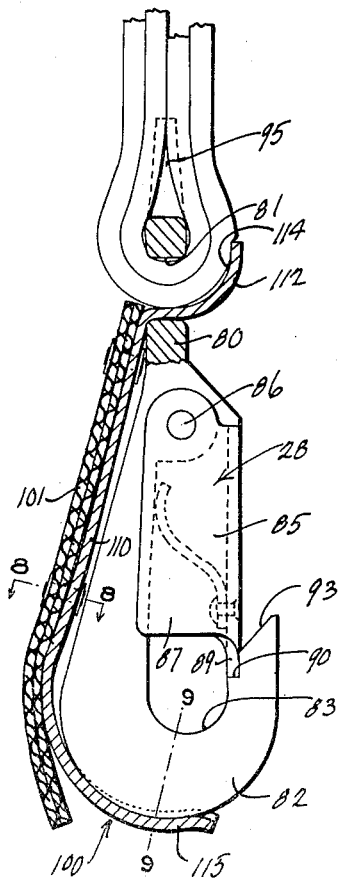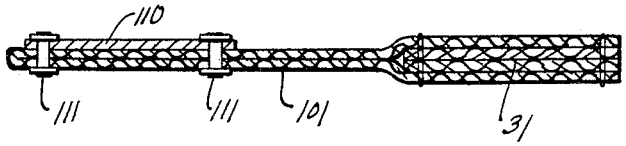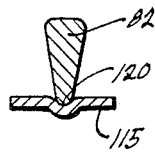

Oct. 1, 1935.  L. L. IRVIN  2,016,236

PARACHUTE APPARATUS

Filed March 28, 1934   3 Sheets-Sheet 3

INVENTOR.
Leslie L. Irvin

BY *Lancaster, Allwine and Rommel*
ATTORNEYS.

Patented Oct. 1, 1935

2,016,236

UNITED STATES PATENT OFFICE 2,016,236

PARACHUTE APPARATUS

Leslie L. Irvin, Letchworth, Herts, England, assignor to Irving Air Chute Company, Inc., Buffalo, N. Y., a corporation Application March 28, 1934, Serial No. 717,858
In Great Britain March 21, 1933

7 Claims. (Cl. 244—21)

This invention relates to improvements in parachute apparatus.

The primary object of the invention is the provision of parachute apparatus including harness adapted to be worn by an aviator, and a detachable pack housing a parachute canopy; the harness and pack having interconnecting coupling means, with improved means upon the harness to support the harness coupling means thereon in a definite relation which will admit of the expeditious attachment of the pack to the harness should an emergency arise.

A further object of the invention is the provision of improvements in parachute equipment of the general nature set forth in a co-pending application, Serial No. 395,399, filed Sept. 26, 1929; including an improved means for releasably supporting the harness attached coupling parts in such definite relation thereon that one can with facility attach the parachute pack to the harness with assurance that the complementary parts of the pack and harness will lie in proper relation for connection.

A further object of this invention is the provision of means adapted to be permanently secured to parachute harness for releasably receiving coupling parts attached to the harness so that the said coupling parts will be located in definite and fixed relation on a harness and at all times so located that the complementary coupling means upon the pack may be instantly attached thereto without the necessity of fumbling.

A further object of this invention is the provision of improvements in parachute apparatus of the nature above described adaptable to the standard type of parachute harness now in general use throughout the United States, including a plurality of leg and breast couplings, and also adaptable to the single point release harness.

Other objects and advantages of the invention will be apparent during the course of the following detailed description.

In the accompanying drawings, forming a part of this specification, and wherein similar reference characters designate corresponding parts throughout the several views, Figure 1 is a view showing a single point release harness of the general nature set forth in U. S. Patents Nos. 1,842,611 and 1,899,656 adapted, however, for releasably receiving a parachute pack, and having the suspension straps or lift webs thereof releasably connected by improved means upon the harness so as to permit the facile attachment of the parachute pack thereto.

Figure 5 is a fragmentary plan view of the container, opened and with its flaps extended, showing more particularly the connection of the shroud lines of the parachute canopy to the attached coupling parts of the pack.

Figure 6 is a cross sectional view taken substantially on the line 6—6 of Figure 5.

Figure 7 is an enlarged fragmentary view, partly in section, showing the lift web attached coupling part in its releasably secured position upon a spring fastening device attached upon a harness so as to definitely position the coupling parts for instant use.

Figures 8 and 9 are cross sectional views taken substantially on their respective lines in Figure 7 of the drawings.

Figure 3:
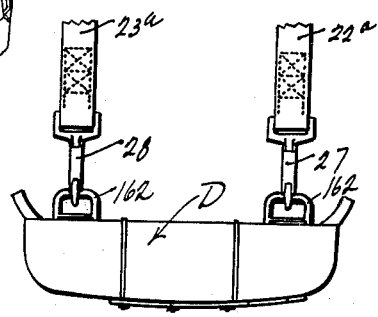
Figure 3 is a view showing the attachment of the complementary couplings of the harness and pack.

In the drawings, wherein for the purpose of illustration are shown preferred and modified forms of the invention, the letters A, B, and C may designate different types of parachute harnesses with which a pack D, shown in Figure 3 of the drawings, is adapted to be detachably connected in a manner which has been more specifically detailed in a co-pending application, Serial No. 395,399, filed Sept. 26, 1929.

Figure 1:
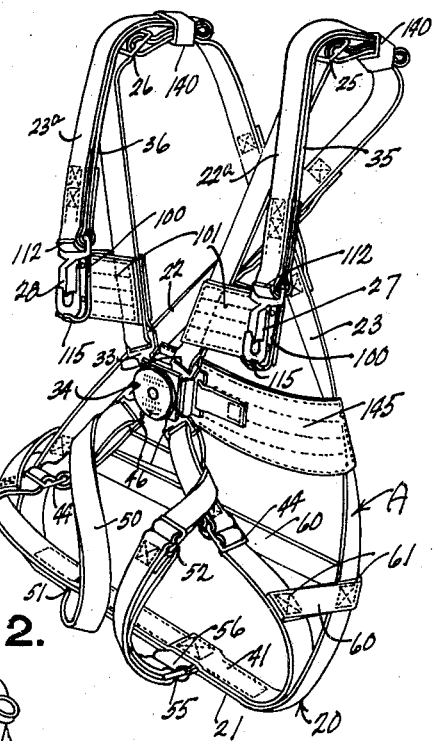
Figure 2:
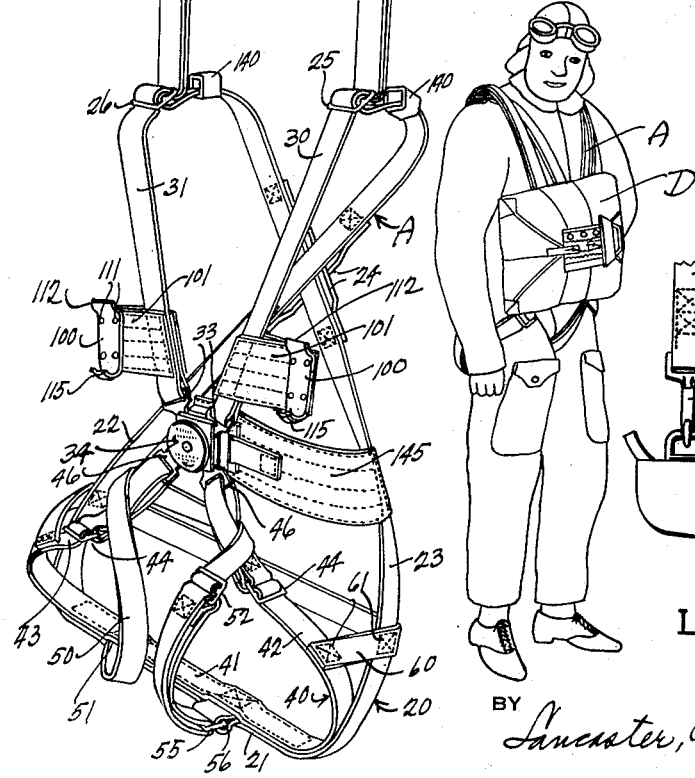
Figure 2 is a view showing the detachable pack operatively connected upon the harness of Figure 1, upon a wearer, and in position for use.

Referring to the single point release harness illustrated in Figures 1 and 2, the same generally includes a sling 20 having a seat portion 21 and side portions 22 and 23. The latter extend across the back of the wearer and having slip loop connections 24 to hold them in properly crossed relation. They are brought over the shoulders of the wearer to the adapters 25 and 26 and adjustably threaded therethrough, and at their outer ends being connected with quick connector fasteners or buckles 27 and 28. The adapters 25 and 26 receive in respective adjusted threaded relation therethrough the straps 30 and 31, which at their lower ends are provided with fastener parts 33 for releasable connection with the quick release fastener device 34. Such fastener device is of the general nature described in detail in U. S. Patents Nos. 1,842,611 and 1,899,656. The opposite portions 35 and 36 of the straps 30 and 31, that is, on the opposite side of the adapters 25 and 26 comprise lift webs which are respectively connected also with the pack attaching coupling parts 27 and 28. The strap portions 22ª and 35 form one lift web for the parachute harness, and the straps 36 and 23ª form the other lift web. By reason of the adapters 25 and 26 the size of the upper portion of the harness may be varied to suit the stature of the wearer.

A minor U-shaped sling 40 is provided as part of the harness, including a seat strap 41 stitched to the seat portion 21 above described; the sling 40 also including the strap portions 42 and 43, adjustable in length by reason of adapters 44, which at the free ends thereof are provided with fasteners 46, similar to the fasteners 33 above described, for releasable connection with the quick release fastening device 34, as will be apparent to those skilled in the art.

On the seat portion of the parachute harness an adjustable strap loop 50 is provided, which is adapted to be extended from the seat straps between the legs of the wearer; the strap portions 42 and 43 being threaded therethrough to provide the leg loops. This loop 50 is fixedly secured at one end 51 upon the seat portions 21 and 41 and at its opposite end it is doubled; the double lengths being adjustable by reason of a sliding adapter 52, as will be quite obvious from Figures 1 and 4 of the drawings. This doubled portion of the loop 50 is threaded through a metal D-ring or other fastener 55 which is secured by a strap portion 56 between the seat portions 21 and 41. By sliding the adapter 52 along the loop 51 the length of the loop may be varied so that the harness may be adjusted to suit the stature of the wearer.

In order to hold the straps 22, 23, 42 and 43 in their proper relation and maintain them in the form of a sling, and to prevent the wearer from falling out of the harness, a strap 60 is employed which is connected to the straps 23 and 42 at spaced points by stitching 61, above the sling seat, and extended across the back horizontally and then similarly connected by stitching to the other two straps 22 and 43.

The parachute pack D includes a flexible container 70, having a body wall 71, and the usual flaps 72 which may be connected in the well known manner to house the shroud lines and parachute canopy in the container, all of which flaps are released by means of a rip cord. If desired the container may be of other shape than that shown, since the features of the invention are adaptable to any type of pack irrespective of the type of container. The body wall 71 of the container is provided with coupling members 160 which have been specifically described in a co-pending application, Serial No. 395,399, filed Sept. 26, 1929, including a portion 161 on each, at the interior of the pack, and an exterior rigid coupling portion 162 providing an eye with which the snap fastener coupling parts 27 and 28 may releasably interconnect. The portions 161 of the couplings 160 have the shroud lines 163 interconnected therewith in any suitable manner, and the couplings 160 are held with the coupling portions 162 extending normal to the plane of the pack wall 71 by means of metal strips 166 which extend through the intermediate narrow eye or slot in the coupling 160. Of course these strips 166 are held in definite relation and fixedly connect the coupling parts 160 so that the coupling eyes 162 thereof are maintained in fixed spaced definite outstanding rigid relation from the pack D, as shown in Figure 3, at all times, irrespective of the packed or unpacked condition of the container.

The snap fasteners 27 and 28 are of identical construction and secured as above mentioned at the ends of the suspension lines or straps. Each consists of a flat loop or ring portion 80 having an elongated eye 81 therein through which the ends of the individual suspension straps 22ª—35 and 23ª—36 are extended and sewn fixedly in place. At one side of the loop 80 is provided a rigid J-shaped hook 82, in the opening 83 of which the eye portions 162 of the couplings 160 are adapted to be received when detachably connecting the pack D upon the harness. A channel-shaped detent 85 is pivoted at 86 upon the upper end of the J-shaped hook 82 so that the channel groove receives the shank of the hook 82 therein and houses a leaf spring 87, which normally urges the lower end extension 89 of the detent into a socket seat 90 provided therefor at the end of the hook. The inner surface of the bight of the channel lies flush with the inside edge of the J-shaped hook to prevent disassemblage of the pack coupling eyes 162 accidentally. The end of the hook 82 adjacent the detent 85 is beveled or inclined downwardly at 93 to facilitate entry of the coupling parts of the pack upon the snap fastener couplings 27 and 28. In order to prevent swinging of the fasteners 27 and 28 upon the suspension lines to which they are connected, the eye portion 80 of each coupling hook is provided with an extension 95 at the opposite side of the eye 80 from the hook; the harness being sewn thereabout to prevent swinging of the hook upon the suspension web as set forth in the said co-pending application, Serial No. 395,399, filed Sept. 26, 1929.

Figure 4:
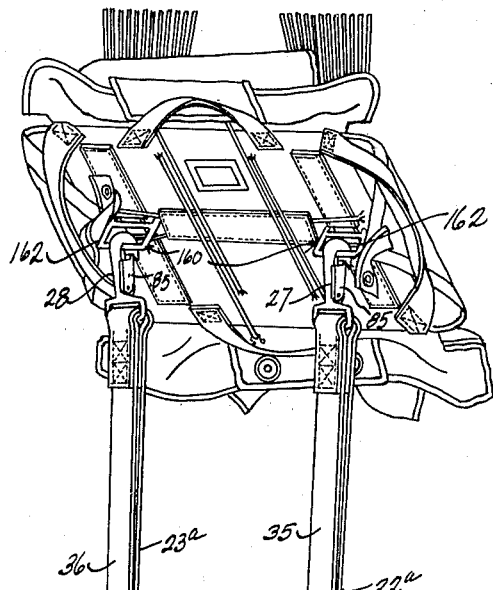
Figure 4 is a perspective view of the harness in the position as worn by an aviator, with the lift webs in their extended position supporting the container which has opened and released the parachute canopy.

Referring to the means for securing the snap hooks 27 and 28 upon the harness, the same may include metallic spring-like gripping sockets or devices 100 which are preferably secured permanently upon appropriate parts of the harness, in any convenient manner. They may be built into the harness if desired. For a quick release harness such as shown in Figures 1 and 4, however, these gripping sockets are supported upon extensions 101 secured to the shoulder straps 30 and 31 above the fasteners 33. These extensions 101 are preferably of webbing doubled or folded in as many layers as necessary to secure the semi-rigidity which is essential in order that the said extensions will maintain their substantially horizontal attitude and hold the coupling fastener sockets 100 in definite relation. The layers of webbing for each extension 101 are preferably secured to both faces of the harness webbing 30 and 31, by means of stitching. If sufficient rigidity is not secured a suitable stiffener may be employed in the extensions 101, since they must maintain the outstanding position from the straps 30 and 31, as shown in Figures 1 and 4 of the drawings.

The sockets 100 are preferably of spring steel or other material of a suitable nature to releasably grip the snap hooks and maintain them in rigid relation with the respective sockets so that the hook ends of the snap fasteners are always presented for facile attachment of the D-rings of the pack thereto. Each of these sockets 100 includes a plate or body portion 110 riveted at 111 to the extension 101. The upper end of the body 110 is forwardly extended substantially normal to the extension 101, at about the upper edge of the extension, and then upturned in a curve 112, so that the same at its concave side 114 provides a socket for receiving the loop portion of the suspension straps which extend through the eye 80 therein; it being intended that the curved end 112 of the socket 100 will be slipped through the lower portion of the eye 81 of the snap fastener, as is shown in Figure 7 of the drawings. The lower end of the socket 100 is curved forwardly from the plane of the body 110 and upwardly in the form of a hook, conforming substantially with the curvature of the bottom edge of the bight portion of the snap hook part 82. This hooked end 115 of the socket 100 has a spring action, so that when the slot of the snap hook is slipped over the upper hooked or curved end 112 of the socket piece, the snap hook 28 is brought downwardly and the bight end of the hook portion 82 is pressed into the curved socket portion 115; the latter being resilient and yielding to permit the snap fastener to be brought into this position where it is held rigidly until jerked from the socket by reason of the opening of the parachute canopy. It is to be noted from Figures 7 and 9 of the drawings that the spring socket end 115 of the socket 100 is provided with a groove 120 for receiving the lower marginal portion of the bight end of the hook 82 to prevent lateral movement of the snap hook in its socket.

The interconnection of the parachute pack with the harness will be obvious from the foregoing. The harness is attached upon the wearer in a manner which has been described in U. S. Patents Nos. 1,842,611, and 1,899,656. The extensions 100 hold the snap hooks in the position shown in Figure 1 of the drawings, definitely and positively spaced with the suspension webs extending downwardly from the shoulders where any slack in them is taken up by the slip loops 140. To secure the pack D it is only necessary to take the same in hand and press the D-rings or coupling parts 162 against the detents of the snap hooks 27 and 28, sliding the D-rings down along the edge 93 into the snap hooks, wherein they are locked by the detents 85. The center-to-center spacing of the coupling rings 162 is exactly the same as the center-to-center spacing between the snap hooks 27 and 28 socketed in the spring socket pieces 100. It is to be noted that the sockets and extensions for securing them to the straps of the harness are not disturbed in any way when the parachute harness is not in use, with the result that the center-to-center spacing between the snap hooks as socketed in the socket members 100 will remain the same when the harness is once adjusted to the stature of any particular wearer, and which center-to-center spacing is the same as the center-to-center spacing of the coupling rings upon the pack. There will therefore be no difficulty in simultaneously snapping both coupling parts of the pack upon the coupling parts.

The quick release fastener 34 may be secured by means of webbing 145 upon any part of the harness, and as set forth in another of my copending applications, the rip cord ring may also be supported upon this piece of webbing. Upon pulling the rip cord the parachute will become deployed and when it is opened and the load comes upon the shroud lines the weight will pull the coupling hooks 27 and 28 from their sockets 100, drawing the suspension lines overhead in a manner shown in Figure 4 of the drawings.

Figure 10:
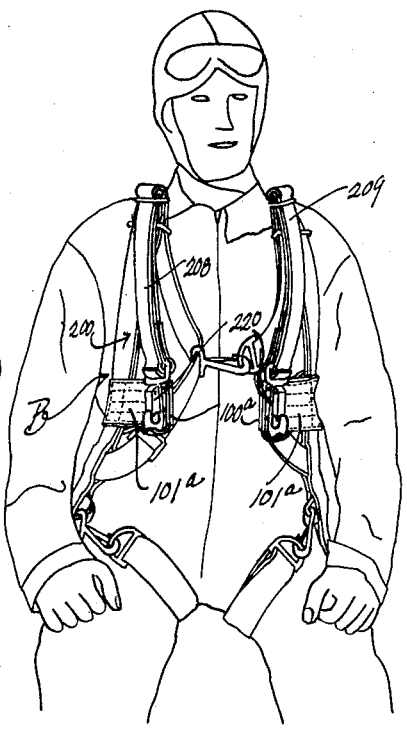
Figure 10 is a view showing the standard type of harness with the improved means for releasably supporting the harness attached coupling parts embodied therewith.
Figure 11:
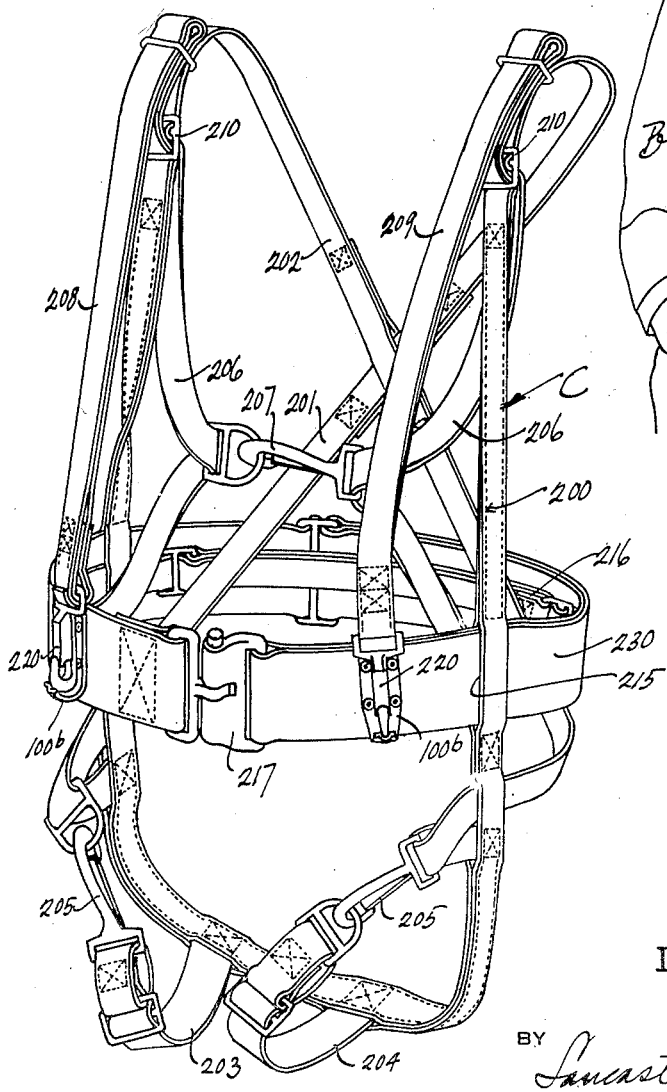
Figure 11 is a perspective view of the standard parachute harness with a modified means for releasably connecting the coupling parts on the lift webs in definite positioned relation.

In the forms of invention shown in Figures 10 and 11 the so-called standard parachute harness is shown, which includes a U-shaped supporting sling 200, diagonally crossed back straps 201 and 202, leg straps 203 and 204 each having releasable coupling devices 205 therein for individual securement. Breast straps 206 are provided having a releasable coupling device 207. Suspension straps 208 and 209 are secured in continuous relation with the riser webs of the sling, being adjustably interconnected with the back and breast straps by suitable adapters 210. All of these parts of the harness are of well known construction generically shown in U. S. Patent #1,560,366. The riser webs of the sling 200 are provided with openings 215 therein through which the lower ends of the breast straps 206 may extend; passing around back of the wearer in an adjustable back strap 216.

In the form of invention shown in Figure 10 the riser portions of the sling 200 are provided with inwardly extending webbing 101ᵃ similar to the extensions 101 above described in the preferred form of invention, which similarly support socket pieces 100ᵃ, in all respects similar to the sockets 100 above described. The suspension lines 208 and 209 at their free ends are provided with snap hooks 220 exactly the same as the snap hooks 27 and 28 above described, and brought forwardly and downwardly along the front of the wearer for disposition in the sockets 100ᵃ, as shown in Figure 10. If desired the extension webbing 101ᵃ may be omitted, but in such case the usual riser webs of the sling will have to be brought closer to the front of the wearer.

In another arrangement for supporting the socket pieces for the snap hooks upon the harness a belt 230 is used, which is slipped through the loops 215 in the riser webs of the harness. It is of the nature of a waist belt and at the front of the wearer may be releasably secured by a coupling device 217. This belt is provided with socket pieces 100ᵇ, exactly similar to the socket pieces 100 above described, and definitely disposed in spaced relation upon the encircling belt for releasably securing the snap hooks of the suspension webs in a manner above described for the preferred embodiment of this invention. It is noted that the circumferential adjustment for the belt is taken care of at the rear, so that the socket pieces 100ᵇ are definitely spaced at all times.

It is to be recognized that the coupling parts upon the pack and harness may vary widely in nature from that shown, and it is not at all necessary to use snap hooks, since other coupling devices may be employed. It is only essential that the coupling parts of the pack and harness be complementary. Likewise if desired I may use the adjustable encircling belt of the illustration in Figure 11 with the single point release harness, since such encircling belt is capable of being associated with such type of single point release harness as set forth in my copending application, Serial No. 717,857, filed March 28, 1934.

Various changes in the shape, size, and arrangement of parts may be made to the forms of invention herein shown and described, without departing from the spirit of the invention or the scope of the claims.

I claim:

1. In parachute harness of the single point release type the combination of a sling in which a parachutist sits as in a swing during descent including a seat portion, back strap means, upper body strap means extending in ends towards the front of the wearer, a loop adapted to extend upwardly between the legs of the wearer, side straps secured to said sling having ends adapted for threading through the loop to provide leg encircling openings, a single point release device for connecting all of said ends together, said loop being secured fixedly at one end to the seat portion of the sling and at its opposite end being doubled upon itself and adjustable in length, an adapter to secure said adjustment, and an adapter on the seat portion of the sling through which said doubled portion of the loop is slidably threaded.

2. In parachute apparatus the combination of a parachute harness including shoulder straps extending diagonally downward from the shoulders of the wearer to the front thereof, means to releasably hold the harness about and upon the body of a wearer, suspension straps connected with the harness having coupling parts thereon, an inherently stiff short extension connected with each of the shoulder straps at the front of the wearer and projecting in counter relation outwardly beyond the respective shoulder straps, keeper devices secured upon said extensions in definitely spaced and facing relation for releasable securement of the coupling parts aforesaid thereto in definitely spaced and facing relation, and a parachute pack including a parachute having exterior coupling parts thereon for releasable complementary connection with the coupling parts of the harness aforesaid.

3. In parachute apparatus the combination of a parachute harness having suspension strap means and a parachute pack attaching coupling part permanently connected therewith, a spring socketing keeper for releasably connecting said coupling part in definitely fixed non-tiltable relation upon the harness, and a detachable emergency parachute pack having a fixed exterior coupling part connected therewith for releasable securement with the coupling part of the harness.

4. In parachute apparatus the combination of a parachute harness having parachute suspension straps, coupling parts permanently connected with said suspension straps, definitely spaced spring socketing keepers permanently connected upon the harness having means for releasably connecting the coupling parts thereon in definite relatively spaced non-tilting relation, and a detachable emergency pack having exterior coupling parts thereon in the same definitely spaced relation as the relation in which the coupling parts first mentioned are maintained by said socketing keepers, whereby the coupling parts of the pack may be attached with facility to the coupling parts first mentioned without the necessity of fumbling.

5. In parachute apparatus a parachute harness having suspension means including a coupling part secured therewith, a detachable pack including a parachute having a coupling part exteriorly upon the pack for complementary connection with the coupling part of the harness, and a keeper permanently secured in a definite relation upon the harness and capable of re-use having means for releasably securing the coupling part of the harness in a direct non-tiltable definitely faced and positioned relation for facile attachment of the pack coupling part thereto.

6. In parachute apparatus a harness having suspension straps provided with coupling parts secured therewith, an emergency pack provided with definitely spaced fixed coupling parts exteriorly thereon, and keeper devices permanently secured upon the harness and capable of re-use for releasably connecting the said coupling parts of the harness directly therewith, said keeper devices including means associated therewith for holding the coupling parts of the suspension straps in non-movable and non-tiltable yet releasable relation definitely faced and definitely spaced in the same spaced relation as the spacing of the coupling parts upon the pack in order to facilitate attachment of the pack coupling parts to the first mentioned coupling parts.

7. In parachute apparatus the combination of a harness including suspension strap means and a coupling part connected therewith, an emergency pack having coupling means for complementary releasable connection with the coupling part of the harness, said coupling part of the harness comprising a snap hook fastener, and a spring type of socketing keeper permanently connected upon the harness in definitely faced relation having means thereon for engaging the ends of the snap hook fastener to prevent lateral and vertical tipping thereof.

LESLIE L. IRVIN.